Aug. 23, 1966     R. W. LINDSTROM     3,268,441
WATER RECOVERY BY ELECTRODIALYSIS
Filed May 21, 1963
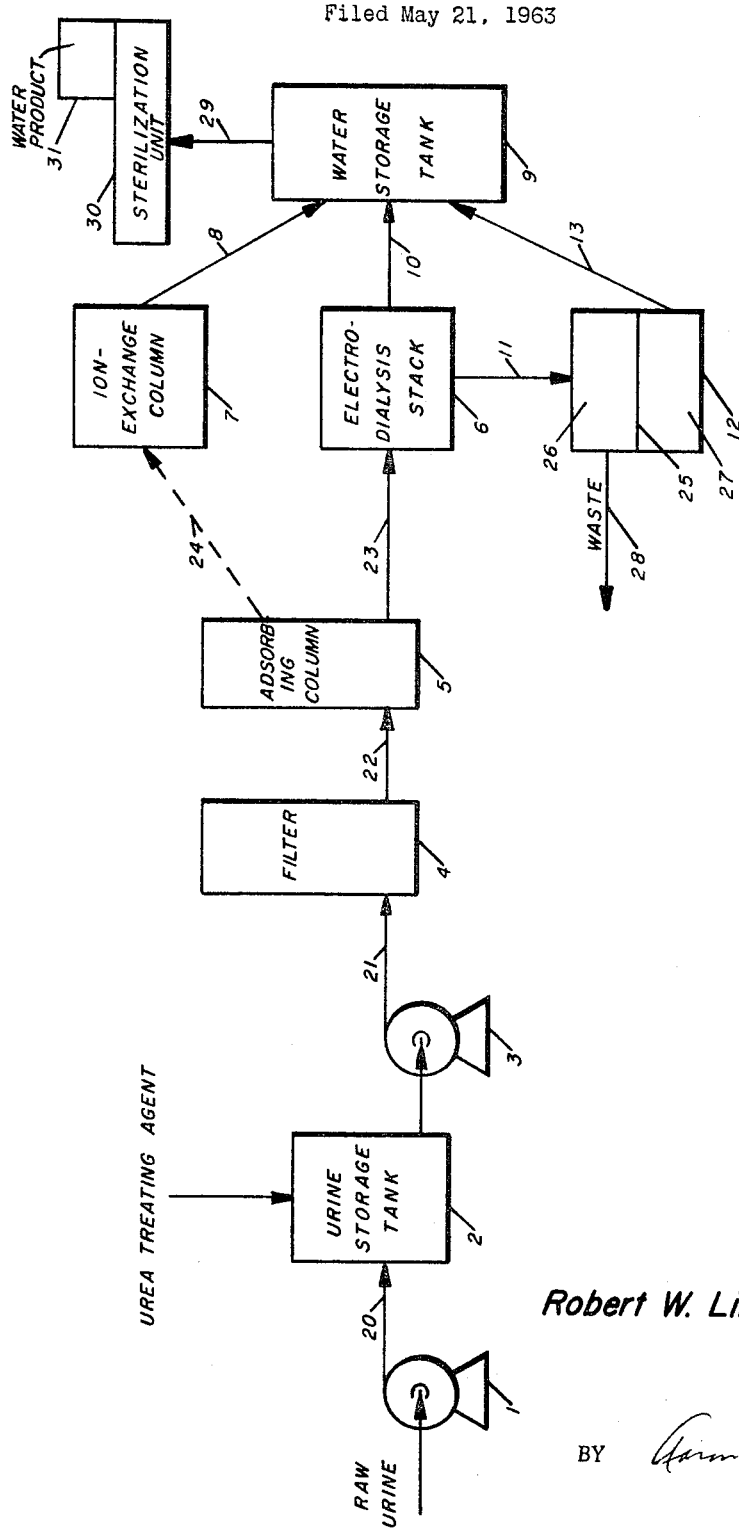
Robert W. Lindstrom
INVENTOR.
BY
ATTORNEY

United States Patent Office 3,268,441
Patented August 23, 1966

3,268,441
WATER RECOVERY BY ELECTRODIALYSIS
Robert W. Lindstrom, Everett, Mass., assignor to Ionics, Incorporated, Cambridge, Mass., a corporation of Massachusetts
Filed May 21, 1963, Ser. No. 281,871
11 Claims. (Cl. 210—22)

This invention relates to water reclamation from biological liquid wastes and in particular to a novel process for recovering potable water from raw urine during manned space flight operation under zero gravity.

With the advent of manned space flights and the possibility in the future of manned orbital space stations, various life supporting systems are required. These systems out of necessity must include a waste disposal and water reclamation subsystem that is reliable and easy to operate. It has been estimated that an astronaut requires approximately 74 lbs. of water per day for normal purposes and therefore a water reclamation system must be employed to supply and make efficient use of the limited amount of water aboard a space vehicle.

Various methods for recovering water especially from raw urine have been suggested in the prior art but these do not completely or satisfactorily give the desired results. These methods are in general similar to those used for the recovery of water from sea water and include among others freezing and distillation processes. The freezing processes depend on the formation of pure ice crystals from a urine solution. A major disadvantage of such processes is that in the formation of the ice crystals, portions of the molten liquid or urine is collectively occluded by the ice crystals resulting in poor quality water and low recovery yields. Many melting and freezing cycles are required to obtain water of reasonable purity and yields and the equipments employed for such separation are large, heavy and complex.

In urine heat distillation processes the presence of urea which may range from 10 to 40 grams per liter of urine will produce a rise in the boiling point of the urine and in turn require a greater energy input. Another drawback to distillation is that the urea on heating has a tendency to hydrolyze to produce volatile ammonium carbonate that will be carried over in the water vapor to contaminate the distilled water product. This is undesirable since even slight traces of ammonia (0.1 p.p.m.) makes drinking water unpalatable and larger quantities may be detrimental physiologically. A post-treatment is therefore required to remove the ammonia to the low levels required for potable water.

The heretofore mentioned prior art processes employ phase changes and are therefore dependent on gravitational forces. The separation of phases under weightless conditions of space travel becomes a problem in such prior methods and an artificial gravity must be employed such as the use of a centrifugal force. These prior art processes and apparatus also involve the consumption of limited available energy and moving parts which can wear out and in general make the apparatus bulky, complex and unreliable.

The present invention is a simplified and reliable process for recovering potable water from waste liquids such as for example urine, fecal water and personal hygiene wash water, especially under conditions of zero gravity. This recovery is achieved by a novel combination of several treatment steps, each step contributing to the efficient removal of some portion of the contaminants present in the waste liquid being treated. Each component step of this novel combination of steps when linked in its proper sequence will produce potable water as the end product. In general the novel process involves removal of suspended solids and dissolved organic materials from the waste liquid by mechanical and chemical means such as by filtration, chemical precipitation, enzymatic conversion or adsorption. Next the removal from the liquid of dissolved ionized salts by the process of electrodialysis or ion-exchange treatment and finally means for sterilizing the resulting water product to make it safe for human use. The process can operate under zero-gravity conditions since only simple pumping techniques are required for the various steps.

It is therefore the object of this invention to recover potable water from waste liquids by a process employing low energy consumption, high water recovery yields and ease and reliability of operation.

Another object is to recover potable water from raw urine under zero-gravity conditions without the inherent disadvantages found in prior art processes.

A further object is to remove the urea and other organic constituents from urine by chemical precipitation, enzymatic decomposition and/or by adsorption on an adsorbing agent prior to removing the dissolved inorganic salts by electrodialysis.

Various other objects and advantages will appear from the following description of the invention and the novel features will be particularly pointed out hereinafter in connection with the appended claims.

The principles and features of the invention are readily understood when taken in connection with the accompanying drawing by considering the basic steps of the process for practicing the same. It is understood that details may be modified without departure from the principles of the invention. Additionally, the invention may be practiced by structures other than the ones shown. The accompanying drawing is a schematic diagram of the apparatus illustrating generally the flow of materials and the treatments thereof.

The process for carrying out the invention will be described in particular to the recovery of water from raw urine since urine is a major source of waste water. However, it is to be understood that the process is not limited to urine alone. In operation, raw urine is passed through conduit 20 under sufficient positive pressure as by a pump 1 to fill a raw urine storage tank 2. Urea, which is the chief decomposition product of the metabolism of nitrogenous materials in the animal body, is excreted in the urine in large amounts. It is preferable that this heavy urea contamination be first removed prior to further treating the urine with an adsorbing agent such as activated charcoal. Of course the charcoal can also be employed to remove the urea as well as the other organic contaminants of urine but, where urea is present, twice as much charcoal is required to remove both the urea and other organic contaminants. Removal of the urea prior to employment of the charcoal lowers the adsorption burden put on the charcoal.

The urea can be removed from the raw urine by any convenient method such as for example by precipitation of the urea as a relatively water insoluble acid salt. Urea will form crystalline compounds with certain water soluble acids. The employment of suitable acids such as oxalic, acetic, tartaric, citric, nitric and the like will react to form the urea salts of such acids. Oxalic acid is preferred since the urea oxalate formed is less soluble in urine than the other acid salts. The urea precipitating agent may be added, with stirring, directly to the raw urine in the storage tank 2 and allowed to react for a short period of time. The amount of acid used should be sufficient to complex and precipitate substantially all of the urea present. The precipitating agent of oxalic acid is effective regardless of the variations in the composition of the urine. The amount of acid used is not critical but of course will vary depending on the urea content of the urine. It has been found that a urine sample containing 12.7 grams of urea per liter was made substantially urea-free by the addition of about 5 grams of oxalic acid. At times it may be found to be more economical to remove less than all of the urea by precipitation and to employ an adsorbing agent to remove the remaining urea. For example, 2 grams of oxalic acid will remove 75% of the urea from the above mentioned urine sample. The remaining 25% of the urea along with other dissolved organic material may then be removed by adsorption on charcoal. An alternate method of selectively removing the urea is by the use of urease of enzymatically convert the urea to the ionizable inorganic salt of ammonium carbonate, which can then be removed by electrodialysis. The urease enzyme is commercially available in a highly stable and highly reactive powder form. The urease should be added to the raw urine in an amount sufficient to hydrolyze at least 95% of the original urea concentration to the ionized salt. By employing a highly reactive urease powder on a urine sample containing 20 grams of urea per liter, it was found that 0.2 gram of urease per 100 milliliters of urine was sufficient to hydrolyze better than 95% of the urea present within a 2 hour period.

After the urea treatment step the urine is passed as by a pump 3 into conduit means 21 and through a filter 4 to remove any precipitated or suspended solids. The effluent from the filter is then passed by conduit means 22 through an adsorbing column 5 to remove the remaining dissolved organic constituents of the urine such as creatinine, allantain, phenols, hippuric and uric acid, etc. Organic adsorption as on activated charcoal is well known and several types of commercially available charcoal may be used successfully. Activated powdered charcoal may additionally be employed as a filter aid for removing the urea complex. The effluent from the adsorbing column 5 is passed through conduit 23 by pressure means (not shown) into electrodialysis unit 6. This effluent is essentially a brine solution containing dissolved salts and minerals which are removed by treatment in an electrodialysis unit 6 preferably employing a recirculating batch type process. The electrodialysis apparatus and process is well known and will be more fully described hereinafter.

Where the solution being treated is relatively low in dissolved salts as for example in the case of waste wash water, it may be advantageous to demineralize the solution by employing an ion-exchange column 7 in preference to electrodialysis. Ion-exchange is a well known process for removing ionizable salts from water. Generally the salt water is passed through a column containing a mixed bed of cation and anion exchange resins. The resins which are preferably in the hydrogen and hydroxyl forms will exchange with the ionized impurities in the liquid; the liberated hydrogen and hydroxyl ions subsequently combining to form additional water. In operation the effluent from the adsorbing column 5 is passed through conduit 24 by pressure means (not shown) into ion-exchange column 7. The deionized water stream resulting from the ion-exchange treatment is then passed through conduit means 8 into tank 9 for storage. Since waste wash water would not contain urea as a contaminant, the urea treatment step employed for processing raw urine would be eliminated.

Membrane electrodialysis is a well known process for the removal of electrolytes from brackish and sea water and from various industrial solution. The process transfers electrically charged ions through perm-selective ion-exchange membranes or barriers as a result of the application of electrical energy. Non-electrolytes such as urea and other organic materials are not under normal conditions removed by electrodialysis. In many cases these organic materials when present in large amounts will cause fouling of the ion-exchange membranes with a resulting increase in the electrical energy requirements of the process. It is therefore important that organic materials be first removed from a solution prior to electrodialysis as has been described herein. In electrodialysis the individual charged ions are removed according to Faraday's Law with the passage of a direct electric current normal to the membranes and electrolyte solution flow. An electrodialysis unit for demineralizing solutions generally comprises a set of diluting or deionizing chambers (for the product stream) alternately disposed between a set of salt concentrating chambers (for the waste stream) and, in addition, at least two terminal electrode chambers containing a cathode and anode for passage of a direct current transversely through the unit. The diluting and concentrating chambers which are disposed between the terminal electrodes are separated from each other by alternately placed anion permeable and cation permeable membranes. In operation the dissolved ionized salts of a liquid are transferred through the appropriate membranes from the deionizing chambers into the salt concentrating chambers by means of a direct current applied transversely across the membranes and chambers. In this manner the ionized salts collect in the concentrating or waste chambers and are carried away through a discharge outlet 11. The solution in the diluting chambers is collected from discharge outlet 10 as a substantially salt-free liquid and stored in tank 9. The combination of a deionizing and concentrating chambers constitutes a cell pair. A large number of cell pairs may be stacked between a pair of electrodes to produce a multicell electrodialysis unit. Such systems showing the arrangement of membranes and electrolyte streams and the method of operation to effect demineralization are more fully described in U.S. Patent Nos. 2,694,680, 2,708,658, 2,752,306, 2,901,900 and many others. The manufacture and properties of ion-selective membranes are fully disclosed in U.S. Patents Nos. 2,702,272, 2,730,768, 2,731,411, Re. 24,865, and others.

The process of this invention may include a separate method of recovering additional water from the salt waste stream that is withdrawn from the electrodialysis unit. A method especially adapted for separating water from a concentrated salt solution is membrane permeation. Such a process changes the composition of a fluid mixture by allowing a portion of the mixture to pass through a substantially non-porous membrane. The membrane exhibits a perm-selectivity for easy passage of one component of a mixture relative to the remaining component. By employing the proper selection of hydrophilic membranes and operating conditions of temperature and pressure, potable water may be separated from an aqueous solution of inorganic salts such as is obtained from the waste stream of an electrodialysis unit. The type of membranes or films that have been employed for water separation have included non-moisture proof Cellophane, films of regenerated Cellulose, hydrolyzed polyvinyl acetate and many others. A permeation unit 12 is divided into two compartments by a non-porous plastic film 25. A salt solution would be introduced into one compartment 26 (liquid phase compartment) and maintained as a liquid at the temperature of operation. The operating pressure in the compartment 26 is usually atmospheric or whatever temperature is required to keep the salt solution in the liquid phase. The water permeating the film or membrane 25 is removed rapidly from the other compartment 27 (vapor phase compartment) which is usually kept at a reduced pressure to maintain a high concentration gradient across the membrane. The process can be operated in either a continuous or batch-wise manner. Permeation involves the following steps: (1) solution of water into the hydrophilic membrane surface which is in contact with the concentrated salt solution, (2) migration of the water molecules through the body of the membrane by an activated diffusion process, and (3) vaporization of the permeating water at the vapor compartment side of the membrane where the vapor is immediately swept away, condensed on a cool surface and collected. Membrane permeation apparatus and processes are more fully described in U.S. Patents.

Nos. 2,386,826 and 2,956,070. A permeation process especially useful for removing water from an electrolyte solution under zero-gravity conditions and employing hydrophilic ion-exchange membranes is fully disclosed in copending application Ser. No. 223,010 filed September 12, 1962, in the name of Robert M. Lurie and David J. Goldstein.

In operation the salt waste stream from the electrodialysis unit 6 is passed by pressure means (not shown) through conduit 11 and into the liquid phase compartment 26 of permeation unit 12. The water passing through the membrane 25 collects in the vapor phase compartment 27 as a vapor where it is removed therefrom by conduit 13, condensed on a cool surface (not shown) and the resulting water stored in tank 9. The permeation process results in producing a highly concentrated salt solution in the liquid phase chamber 26 which is removed therefrom through conduit 28 as a waste solution.

The combined water collected in storage tank 9 may be passed by pressure means (not shown) through conduit 29 and into a sterilization unit 30. Sterilization may be accomplished by any safe and convenient means. The best known method of killing all virus and bacteria is to heat the water to boiling for at least two hours. However this requires large amounts of energy and is not feasible when employed on a space station. An alternate method would be sterilization by ultra-violet radiation or by chemical additives. The water thus sterilized is removed through conduit 31 as a product sufficiently safe for human consumption.

The following examples show by further illustration and not by way of limitation the invention disclosed herein:

*Example 1*

Oxalic acid was slowly added with stirring to about 3 liters of raw urine and allowed to react for a short period of time. The raw urine contained about 13 grams of urea per liter and required about 5 grams of oxalic acid to precipitate substantially all the urea present. The liquid mixture was passed through a filter to remove the precipitate and other suspended matter and then passed through a two inch diameter column of activated granular cocoanut charcoal at about 30 millimeters per minute. This step required about 200 grams of charcoal per liter of solution treated. The liquid resulting from the charcoal treatment was colorless, odorless and substantially free of all organic matter. The clear liquid brine solution containing about 15,000 p.p.m. of dissolved salts was then deionized in an electrodialysis unit. The diluting chambers of the unit were previously packed with a 50/50 mixture of cation and anion exchange resin beads to act as a conducting bridge across the diluting chambers. The use of ion-exchange beads is advantageous since during the latter stages of the deionization process, the electrical resistance of the diluting stream may become very high due to loss of its salt content resulting in an increase of the electrical energy required for the deionization process. A small portion of the salt solution was employed to fill the concentrating chamber of the electrodialysis unit and the remaining salt solution was continually recirculated through the resin filled diluting chambers until its salt content was reduced to less than 150 p.p.m. During the deionization cycle the current density employed was controlled so as not to cause concentration polarization and its resulting dissociation of water molecules. The waste salt solution from the unit's concentrating chambers was further treated in a membrane permeation apparatus to recover additional salt-free water. The permeation apparatus employed a cation perm-selective membrane to separate the liquid and vapor phase compartments. The cation membrane comprised a sulfonated copolymer of divinylbenzene and styrene. The salt solution was passed into the liquid phase chamber and maintained at a temperature of 120° F. The vapor phase compartment operated under a vacuum of about 66 centimeters of mercury. The reduced pressure required in the vapor compartment may be obtained in space flight by employing the vacuum of space. The water permeating the membrane as a vapor was collected from the vapor compartment as a substantially salt-free distillate. The rate of water recovery was about 2 milliliters per minute per square foot of permeating membrane surface. The combined water obtained from the electrodialysis and permeation process gave a water recovery yield of about 91%. This water was then sterilized by ultra-violet radiation to produce a product sufficiently safe for human consumption.

*Example 2*

Three liters of raw human urine containing approximately 20 grams of urea per liter was enzymatically converted to the salt of ammonium carbonate by the addition of urease. It was found that 0.2 gram of "Soluble" urease powder per 100 ml. of raw urine was sufficient to hydrolyze 95% of the urea within a two hour period. Thus for treating 3 liters of urine 6 grams of urease was required. The treated urine was then contacted with charcoal and electrodialyzed as in Example 1. A 90% total water recovery was obtained.

*Example 3*

Three liters of a raw urine having the same composition as used in Example 1 was passed through activated charcoal to remove all of the organic constituents. No urea treatment step was employed prior to the charcoal treatment and therefore about 400 grams of charcoal per liter of urine was required to adsorb the organics. The clear, colorless salt solution resulting from this treatment was further processed in an electrodialysis unit in the same manner as described in Example 1. As 88% total water recovery was obtained by this method.

What is claimed is:

1. A process for the recovery of water from biological waste solutions comprising the steps of removing suspended and dissolved organic matter therefrom, said dissolved organic matter being removed by contact with an absorbing agent, deionizing the resulting solutions by electrodialysis and recovering the product water.

2. A process for the recovery of water from raw urine comprising the steps of:
   (a) removing from said raw urine at least a portion of the dissolved urea component,
   (b) contacting the urine relatively free from dissolved urea with an absorbing agent to remove any remaining organic components present therein,
   (c) treating at least a portion of the resulting organic free liquid by membrane electrodialysis to remove ionized salts therefrom, and
   (d) collecting said liquid as a water product substantially free of dissolved materials.

3. A process for the recovery of water from raw urine comprising the steps of:
   (a) removing at least a portion of the dissolved urea component of said raw urine by treating said urine with an acid capable of forming a relatively water-insoluble precipitate of the urea salt of said acid,
   (b) removing said precipitate from the urine thus producing a relatively urea-free urine,
   (c) contacting said relatively urea-free urine with an adsorbing agent to substantially remove therefrom any remaining organic constituents and odors,
   (d) removing from the organic-free liquid the ionized salts present therein by electrodialysis treatment, and
   (e) recovering the resulting liquid as a water product substantially free of suspended and dissolved materials.

4. The process of claim 3 wherein the acid employed in step (a) is selected from the group consisting of oxalic, acetic, tartaric, citric and nitric acid.

5. The process of claim 3 wherein the acid employed in step (a) is oxalic acid and the adsorbing agent employed in step (c) is activated charcoal.

6. A process of recovering potable water from raw urine comprising the steps of:
    (a) reacting at least a portion of the dissolved urea of said raw urine by the addition of oxalic acid to form a precipitate of urea oxalate,
    (b) filtering the resulting mixture to remove the urea oxalate and other suspended material,
    (c) treating the resulting liquid with activated charcoal to substantially remove remaining organic components therefrom,
    (d) passing at least a portion of the resulting organic-free liquid through the desalting chambers of an ion-exchange electrodialysis unit to remove dissolved salts therefrom, and
    (e) treating the salt waste stream from the concentrating chambers of said electrodialysis unit by a membrane permeation process to obtain additional salt-free water therefrom.

7. The process of claim 6 wherein all said steps are conducted under zero gravity environment.

8. The process of claim 6 wherein the substantially salt-free waters obtained from said electrodialysis and membrane permeation process is sterilized to make it safe for human consumption.

9. A process for the recovery of water from urine comprising the steps of:
    (a) converting at least a portion of the dissolved urea component to an ionizable salt by treating said urine with a urease enzyme,
    (b) contacting said urine with an adsorbing agent capable of removing substantially all remaining organic components therefrom,
    (c) passing at least a portion of the organic-free liquid through the desalting chambers of an ion-exchange membrane electrodialysis unit to remove dissolved salts therefrom, and
    (d) treating the salt waste stream from the concentrating chambers of said electrodialysis unit by a membrane permeation process to obtain additional salt-free water therefrom.

10. The process of claim 9 wherein all said steps are conducted under zero gravity environment.

11. The process of claim 9 wherein the substantially salt-free waters obtained from said electrodialysis and membrane permeation process is sterilized to make it safe for human consumption.

References Cited by the Examiner

UNITED STATES PATENTS 3,127,243   3/1964   Konikoff _____ 210—63 X

MORRIS O. WOLK, *Primary Examiner.*

E. G. WHITBY, *Assistant Examiner.*